June 22, 1948. B. A. PRINCE 2,443,801
SPLICE FOR GRATING STRUCTURES
Filed March 22, 1945

INVENTOR
BURTON A. PRINCE

June 22, 1948.   B. A. PRINCE   2,443,801
SPLICE FOR GRATING STRUCTURES
Filed March 22, 1945
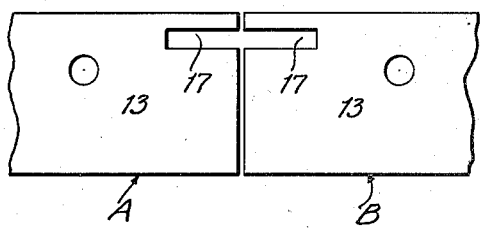
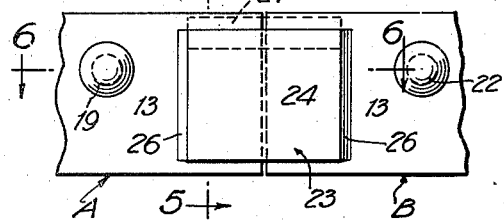
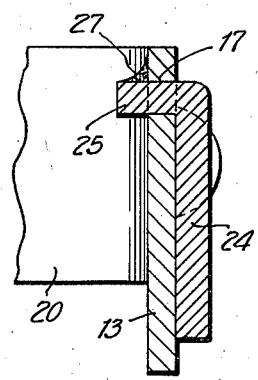
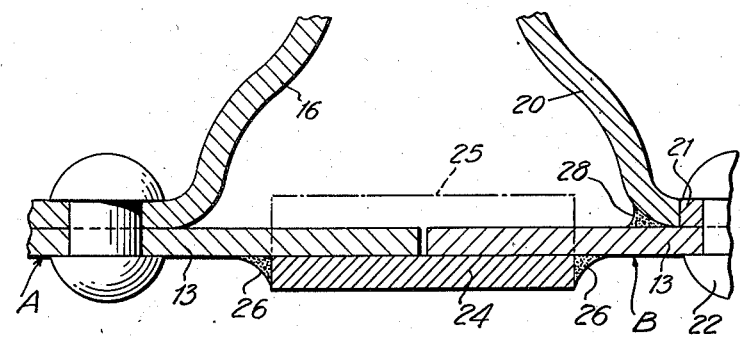
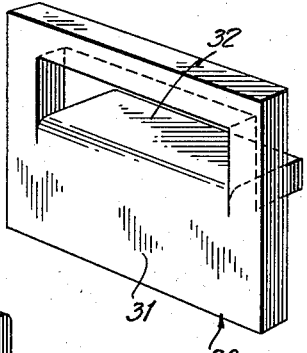
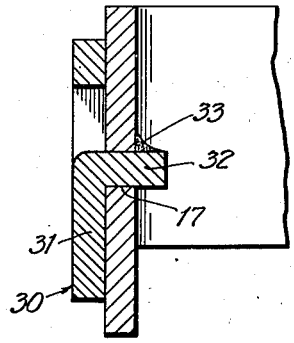
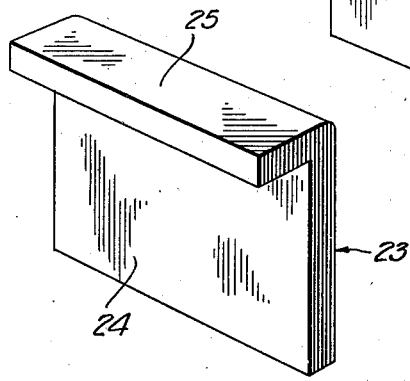
INVENTOR
BURTON A. PRINCE
BY
ATTORNEYS Patented June 22, 1948

2,443,801

UNITED STATES PATENT OFFICE 2,443,801

SPLICE FOR GRATING STRUCTURES

Burton A. Prince, Westfield, Mass., assignor to Walter Edward Irving, Glenbrook, Conn.

Application March 22, 1945, Serial No. 584,077

5 Claims. (Cl. 189—82)

This invention relates to improvements in continuous grating structures, and more particularly to a splice for coupling the ends of adjacent grating panels together to form a uniform traffic-bearing grating surface over which motor vehicles and the like are adapted to travel. Such grating structures are known as decking and are used upon bridges, elevated highways, roadways, to form a traffic-bearing surface.

The primary object of this invention is to provide a splice coupling for the adjacent meeting ends of grating panels which maintains the continuity of the traffic-bearing surface throughout the area of the decking or grating structure, so that the wheels of a motor vehicle may ride smoothly over the structure. Heretofore, splice joints between grating panels which break the continuity of the traffic-bearing surface have caused the occupants of motor vehicles passing over such joints to experience the sensation of the vehicle weaving and swaying which is similar to a skidding sensation.

Other important features of the invention are; to provide a welded splice connection between the ends of adjacent grating panels which eliminates offset bars and low crimps in the reticuline strips; no rivets in the end splice; easier to assemble on a job, for the welding clip compensates for any variations in the grating panels due to the fact that the panels are butted end to end; reduction in the amount of labor upon a job, for a single welder can do the work of several riveters; eliminates four-bar clusters at the joint; and the grating panels per se stand shipment well without damage to the free coupling ends thereof.

Other novel features of the invention will become apparent as the following specification is read in conjunction with the accompanying drawings, in which, Figure 1 is a fragmentary top plan view of adjacent ends of a pair of grating panels in separated relation for subsequent coupling together by means of my improved splice, parts being broken away in section.

Figure 3 is a fragmentary side elevational view of the free meeting ends of a pair of grating panels prior to the insertion of the welding clip.

Figure 4 is a view similar to Figure 3 showing the welding clip in position and the completed splice connection.

Figure 5 is an enlarged vertical sectional view on the line 5—5 of Figure 4.

Figure 6 is an enlarged fragmentary horizontal sectional view on the line 6—6 of Figure 4.

Figure 7 is a perspective view of the splice clip per se.

Figure 8 is a detail vertical sectional view illustrating a modified form of welding clip.

Figure 9 is a perspective view of the welding clip per se shown in Figure 8.

Figure 1:
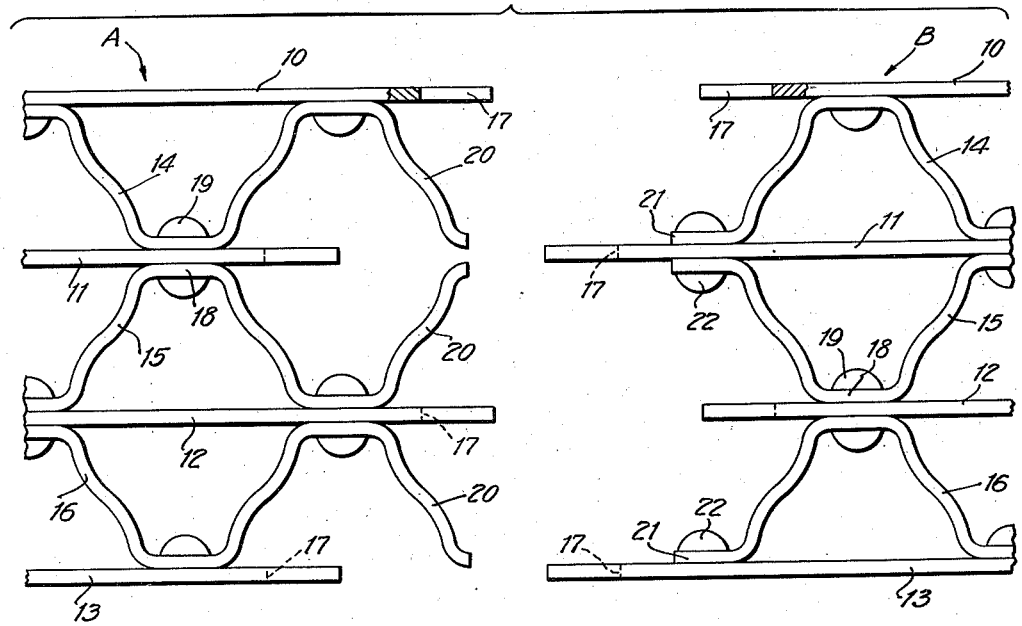
Figure 2:
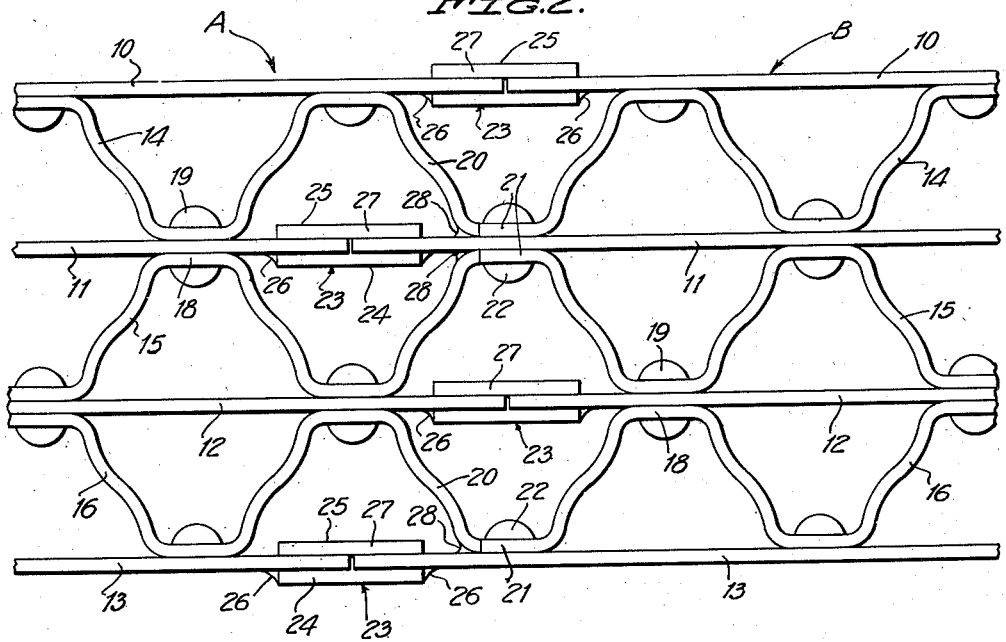
Figure 2 is a fragmentary top plan view of a pair of grating panels having their adjacent ends connected together by my improved splice.

Referring to the drawings by reference characters, and at present to Figures 1 and 2 of the drawings, the letters A and B designate two traffic-bearing grating panels arranged in end to end relation and forming part of one row of panels, it being understood that any number of rows of panels may form the decking or grating structure depending on the width of the same. The grating panels A and B are of like construction, therefore a description of one will suffice for the other.

Each traffic-bearing panel includes a plurality of spaced longitudinal metal bars, the number of which depends upon the width of the panel desired. The length of the bars also depends upon the length of the panel desired, and in practice, the length and width of each panel will be such as to enable the expeditious handling of the panels during shop manufacture, shipment, and upon a job. For illustrative purposes, only four of such longitudinal bars have been shown in the drawings and are respectively designated 10, 11, 12 and 13. The bars 10 and 13 constitute outer bars while the bars 11 and 12 are intermediate bars. Interposed between the bars 10 and 11, 11 and 12, 12 and 13, are crimped metal strips 14, 15 and 16 respectively.

The straight bars 10, 11, 12, and 13 are of the same length but their ends terminate in alternate staggered relation so that the spliced joints therebetween will be correspondingly staggered to impart added strength thereto.

The opposed ends of each straight bar is provided with an elongated slot 17 which extends inwardly from the end edge thereof and is disposed adjacent and parallel to the top bearing surface of the bar.

The crimped strips 14, 15, and 16 are of the same length and the respective ends thereof terminate in transverse alinement as best illustrated in Figure 1. Each crimped strip is provided with flat equidistantly spaced bar-contacting portions 18, each of which is secured to its adjacent bar by a rivet 19. One end of each strip terminates in a free leg portion 20 which constitutes a partial crimp. The other end of each strip terminates in an ear 21 fixedly secured to an adjacent bar by a rivet 22. The ear 21 is the equivalent to the bar-contacting portions 18 and in conjunction with the leg portion 20 of the corresponding strip of an adjacent panel forms a complete crimp at the joint therebetween. The crimped strips are of a height less than that of the bearing bars and have their top surfaces disposed on the same plane as the top surfaces of said bars.

The panels A and B are fabricated in the shop to the extent shown in Figure 1, wherein each panel is a complete unit in itself and the opposed ends thereof are complementary to each other.

Assume that the two shop fabricated grating panels A and B are to be placed in position upon a job to form a continuous traffic-bearing grating structure. The panels A and B are placed end to end with one end of one panel in longitudinal alinement with the complementary end of the other panel as illustrated in Figure 1. The panels may now be shifted longitudinally toward each other to cause the slotted ends of the bars to abut and the slots 17 to aline (Figure 3) and the free ends of the legs 20 to respectively abut the free ends of the respective ears 21 as best illustrated in Figures 2 and 6. The panels A and B are now in a position for splicing by welding in a manner now to be explained.

The meeting ends of the straight bars 10—10, 11—11, 12—12, and 13—13 of the panels A and B are respectively keyed and secured together by welding coupling clips 23.

Each welding clip 23 is constructed of metal having an affinity for welding to the meeting ends of the straight metal bars. The clip 23 comprises a flat vertical web or body portion 24 having an integral flange 25 extending from the top edge thereof and a right angle thereto. The flange 25 is of a thickness equal to the width of the confronting slots 17—17 and of a length equal to the combined length of the confronting slots.

A clip 23 is applied to the meeting ends of the respective bars of the panels A and B and welded thereto in a manner now to be explained. The flange 25 of a clip 23 is inserted through the alined slots 17—17 and is of a width to extend a substantial distance beyond the adjacent side face of the bars as best illustrated in Figure 5. The flat web or body portion 24 flatly engages the other side face of the bars and bridges the joint therebetween as illustrated in Figures 4 and 6. After the clip 23 has been placed in the position just described, a welder on the job, welds the ends of the body portion 24 to the respective bars as at 26—26 along the entire height of the body portion. The welder also welds the length of the free end of the flange 25 to the adjacent portion of the side faces of the bars as at 27.

When all of the meeting ends of the straight bars of panels A and B are spliced in the manner just described, the free ends of the leg portions 20 of strips 14 and 15 of panel A are respectively secured to opposite sides of the straight bar 11 of panel B. The free end of leg portion 20 of strip 16 of panel A is likewise welded to the straight bar 13 of panel B as at 28. As previously mentioned, the free ends of the leg portions 20 of panel A abut the respective ears 21 of the crimped strips 14, 15 and 16 of panel B and cooperate therewith to form a complete crimp at the meeting ends of the crimped strips to maintain continuity of the traffic bearing surfaces thereof. Due to the welding clips 23 being disposed below the traction surface of the alined straight bars at the joints therebetween, the continuity of the traction surface of the straight bars is maintained.

In Figures 8 and 9 of the drawing I have illustrated a modified form of welding clip 30 which is constructed of flat metal capable of being welded to the meeting ends of a pair of alined straight bars. The clip 30 includes a body portion 31 having a right angularly extending flange 32 struck out therefrom. In practice, the body portion 31 fits flat against the sides of the bars to be spliced while the flange 32 extends through the alined slots 17—17. The ends of the body portion 31 are welded to the respective bars in the same manner as shown at 26—26 while the projecting portion of the flange 32 is welded to said bars as at 33. In this form of welding clip 30, the slots 17—17 are disposed approximately midway of the height of the bars instead of adjacent the top edge thereof as shown in the preceding form of the invention illustrated in Figures 1 to 7 inclusive.

While I have shown and described what I consider to be the most practical embodiments of my invention, I wish it to be understood that such changes in construction and design as come within the scope of the appended claims may be resorted to if desired without departing from the spirit of my invention.

Having thus described my invention, what I claim as new and desire to secure by Letters Patent is:

1. A continuous traffic-bearing grating structure comprising in combination, a pair of grating panels arranged in end to end relation, each of said grating panels having a plurality of spaced straight metal bars, the adjacent ends of the bars being in close relation and in longitudinal alinement and having alined slots extending inwardly from the said ends thereof, metal weld members for connecting the respective alined adjacent ends of the bars of the panels together, each of the weld members having a body portion fitting against one side of the meeting end portions of the bars and bridging the joint therebetween, an angular flange integral with the body portion and extending through the alined slots, and welds connecting the weld member to the adjacent ends of said bars.

2. A continuous traffic-bearing grating structure as set forth in claim 1 in which the free end of the flange of the weld member extends through the slots and beyond the bars, and a weld connecting the free end portion of the flange to adjacent portions of the bars.

3. A continuous traffic-bearing grating structure comprising in combination, a pair of like grating panels arranged in end to end relation, each of said grating panels having a plurality of spaced straight metal bars, the adjacent ends of corresponding bars being in longitudinal alinement and in relatively close relation, the adjacent ends of each pair of alined bars having alined slots extending inwardly from the end edges thereof, metal weld clips for connecting the respective alined adjacent ends of the bars of the panels together, each of the weld clips comprising a flat body portion and a right angularly extending flange integral with the body portion, the body portion flatly fitting against one of the sides of the bars and bridging the joint therebetween and the free end of the flange extending through the alined slots and beyond the other side of said bars, welds connecting the body portion of the weld clip to the bars, and a weld connecting the free end of the flange to said bars.

4. A continuous traffic-bearing grating structure comprising in combination, a pair of like grating panels arranged in end to end relation, each of said grating panels including a plurality of spaced straight metal bars, intervening crimped metal strips between adjacent bars, said crimped strips being of uniform length and terminating at one end of the panel in free end portions and at the other end of the panel in fixed end portions, the free end portions of one panel abutting the corresponding fixed end portions of the other panel, and welds connecting the free end portions of the crimp of one panel to the adjacent straight bars of the other panel, the adjacent ends of the bars of the panels being in longitudinal alinement, a metal welding clip bridging the joint between the adjacent ends of each pair of alined bars, and welds connecting the clips to the respective bars.

5. A continuous traffic-bearing grating structure as set forth in claim 4 in which the straight bars are of uniform length and alternately offset in a longitudinal direction to cause the joints between bars of the panels to be alternately staggered in a transverse direction.

BURTON A. PRINCE.

REFERENCES CITED

The following references are of record in the file of this patent:

UNITED STATES PATENTS

| Number | Name | Date |
|---|---|---|
| 1,666,614 | Woods | Apr. 17, 1928 |
| 1,817,463 | Price | Aug. 4, 1931 |
| 1,970,422 | Foster | Aug. 14, 1934 |

FOREIGN PATENTS

| Number | Country | Date |
|---|---|---|
| 552,128 | Great Britain | Mar. 24, 1943 |

OTHER REFERENCES

Catalogue 138 of the Reliance Steel Products Co., McKeesport, Pa., pages 24 and 25. (Copy in 94–30.)